April 9, 1968  E. W. CAREY  3,376,651

INSIGNIA POSITIONING DEVICE

Filed Dec. 7, 1965

INVENTOR
ELDON W. CAREY

BY Robillard and Byrne
ATTORNEYS

United States Patent Office 3,376,651
Patented Apr. 9, 1968

3,376,651
INSIGNIA POSITIONING DEVICE
Eldon W. Carey, Heidelberg, Germany (% Transportation Directorate, Headquarters, USAREUR, APO New York 09403)
Filed Dec. 7, 1965, Ser. No. 512,057
3 Claims. (Cl. 33—180)

ABSTRACT OF THE DISCLOSURE

An insignia positioning device which has a template whose neckline edge carries a channel-shaped clip for removably securing the device in position on a jacket. The template has upper and lower spacing edges perpendicular to the neckline edge and between which there is provided a parallel slot. A carrier is longitudinally slidable within the slot. A positioning guide projects downwardly from the carrier below the template while a centering arm is mounted on the carrier above the template. The centering arm is pivotally disposed on the carrier for movement into and out of a position parallel to the neckline edge of the template so that upon locating the proper insignia position, the centering arm may be pivoted out of the way to keep from hindering insignia manipulation.

---

The invention disclosed herein pertains to an insignia positioning device for properly aligning insignia on a uniform.

It is recognized that means of the above type are not basically new, and that the one disclosed herein is an improvement in the art, examples of the best prior art known to the applicant being Bell's U.S. Patent 3,092,915 and Best's U.S. Patent 3,129,515.

The object of the invention therefore is an insignia positioning device, wherein there is combined template and a movable positioning guide, a centering arm, and means for removably securing the device on a uniform whereby both hands are free for the manipulation of the insignia and centering arm.

The foregoing and other objects will become apparent from the description herein when read in light of the accompanying drawings wherein.

Figure 1:
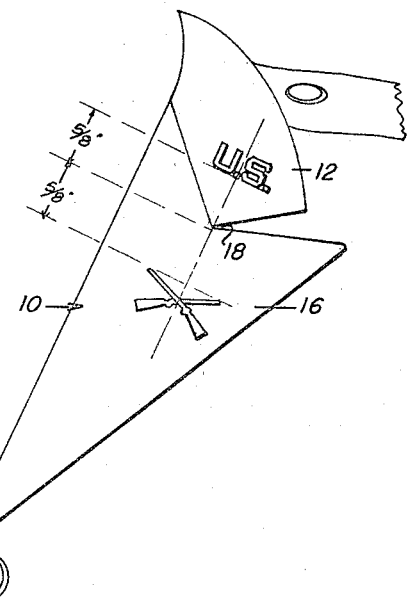
FIGURE 1 is a partial view of the collar-lapel portion of a uniform.

Referring to the drawings, the device includes a spacing template A, a positioning guide B, a centering arm C, and a securing means D.

The device finds greatest usefulness in positioning insignia on the collar-lapel portion of a uniform. As indicated in FIGURE 1, the uniform jacket has a neckline 10, a collar 12, and a lapel 16. The collar 12 and lapel 16 are separated by an outwardly facing V opening having an apex 18 at the joinder of the collar and lapel. As seen in FIGURE 1, the upper insignia of an Army uniform is positioned with its lower edge on an edge line at right angles to the neckline 10 and five-eighths of an inch above the apex 18, the center of the insignia being on a centering line at right angles to the edge line and passing through the apex 18. When a lower insignia is worn, its upper edge is on an edge line at right angles to the neckline 10 and five-eighths of an inch below the apex 18, the center of the insignia being on a centering line at right angles to the edge line and passing through the apex 18.

Figure 2:
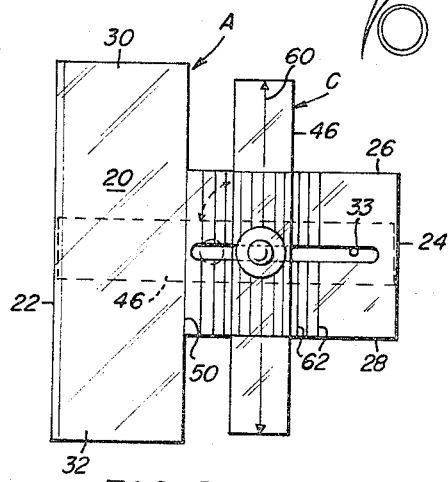
FIGURE 2 is a plane view of the device herein.

Referring to FIGURE 2, the device is dimensioned to accurately set the insignia as required by FIGURE 1, it being apparent that the dimensions may be changed to meet different positioning requirements. The template A is shown of T-square configuration having a rectangular center plate 20 with a neckline edge 22, a parallel outer edge 24, and upper and lower spacer edges 26 and 28, the width between them being that required for the vertical spacing, herein being one and one-quarter inches. The T arms 30 and 32 give greater utility to the device, as hereinafter explained, but are not essential to the proper spacing of the collar-lapel insignia.

The template is provided with a center slot 33, arranged parallel to the spacer edges 26 and 28, and with a line through its longitudinal center equidistant from said edges. The distance from the inner edge 22 of the template to the outer end of slot 33 must be greater than the distance from the neckline 10 of the jacket to the V apex 18 and thus the template is an elongated rectangle.

Longitudinally slidable in the slot 33 is the positioning guide B which includes a carrier 34 having top and bottom members 36 and 38 of larger cross area than slot 33 and slidable on the opposed faces of the template, the members 36 and 38 being fixed to a center pin 40 which projects above and below the members 36 and 38. The portion of the pin 40 within the slot is of a diameter to permit longitudinal movement of the carrier within slot 33, but does not permit transverse movement. The depending portion 42 of pin 40 constitutes a positioning guide, which as hereinafter seen is receivable in the V opening of the jacket.

The carrier 34 further supports the centering arm C, this arm being shown as a narrow rectangular member pivoted at its longitudinal and transverse center on the upper portion 44 of the carrier pin 40. A spacer ferrule 48 may be inserted between arm C and the carrier member 36.

With the above construction, it will be seen that upon longitudinal movement of carrier 34, both the positioning guide 42 and arm 46 are movable therewith, the arm 46 also having rotational movement relative to the carrier.

The device further includes positioning and securing means D, comprising a positioning ledge 50 depending from the neckline edge 22 of the template, and a clip member 52, extending inwardly from the lower edge of ledge 50; member 52 underlying the template for gripping the jacket material between the bottom face of the template and the upper face of clip member 52. With the depending ledge 50 constituting a positioning means along the neckline, and the positioning guide B constituting a positioning reference point at the V apex 18, it is seen that if lines are drawn from B to the outer ends of ledge 50 an isosceles triangle results regardless of the position of B, in that it is movable only along the longitudinal center line of the template, this movement compensating for differences in depths of the V opening, which will occur, whether uniforms are standard issue or tailormade.

With the above construction, the device is initially positioned by placing the positioning guide 42 in the uniform V and moving it to the apex 18 of the V. Thereafter the template is moved into position to align the neckline edge 22 with the neckline 10. In so doing the material of the jacket will enter the removable securing means D and the ledge 50 will position the template along the neckline 10. As the template is rotatable about the carrier 34, and therefore about the guide B, which is a fixed point of reference at the V apex 18, the edge 22 will be accurately aligned on the neckline 10 and removably secured thereon.

The upper and lower insignia may now be positioned against the spacer edges 26 and 28, the arm 46 having been rotated to the dotted line shown in FIGURE 2, in order not to hinder manipulation of the insignia. Arm 46 is now rotated to center the insignia, it being provided with a longitudinal centering line 60, and preferably made of transparent material. The centering line 60 is also offset toward the neckline edge 22 the radius of pin 40 to assure its passing exactly through the apex 18 of the V. The template is also provided with guide lines 62 extending between the spacer edges 26 and 28 and at right angles thereto for ready alignment of line 60. When so aligned it will also be parallel to neckline edge 22, and when so positioned, the centers of the insignia may be aligned therewith and properly positioned.

The centering arm 46 is shown as pivotally mounted in order conveniently to move it out of the way, however, it could be fixed on carrier 34 with its center parallel to neckline edge 22. Also as seen the template and removable securing means are made of a single member, preferably of plastic, it being obvious that other materials could be used as well as other clipping means. It is also apparent that by turning the device through 180°, it may be used on the right collar-lapel portion of the jacket.

Figure 3:
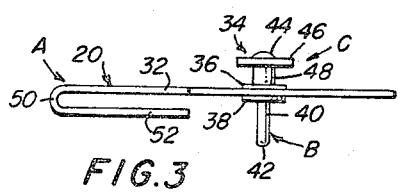
FIGURE 3 is a side view of FIGURE 2.
Figure 4:
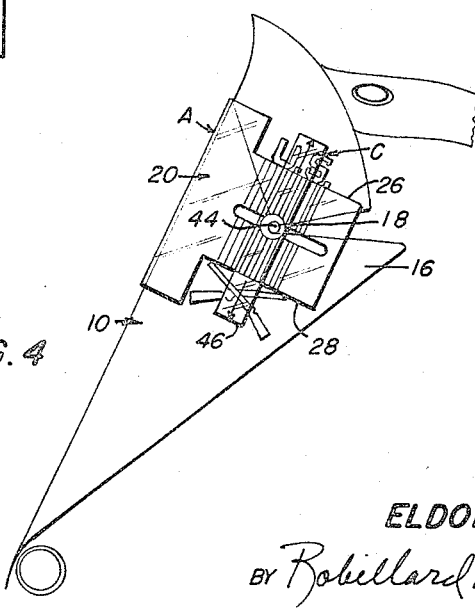
FIGURE 4 is a view similar to FIGURE 1 with the device in position.

As previously stated the T-arms may or may not be used. They have the advantage of making the device useable for spacing cap or shirt collar insignia as shown and described in the Best patent. In these instances, the centering arm does assist in the vertical alignment of insignia, such as shields, which have top and bottom centering points, but would only make a line contact with the template (see FIGURE 3 of Best).

The invention having been described, the following claims define the patentable subject matter disclosed herein and equivalent structures:

I claim:
1. An insignia positioning device including,
   an elongated rectangular template having a neckline edge, an inner edge and upper and lower spacing edges perpendicular to said neckline edge,
   a positioning ledge depending downwardly from said neckline edge,
   said template having a slot extending longitudinally along the longitudinal center line of said template and perpendicular to said neckline edge,
   a carrier longitudinally movable along said slot, with the lower end of said carrier extending below said template to form a positioning guide,
   a centering arm carried by said carrier above the template,
   means mounting said centering arm for movement into and out of a position parallel to the neckline edge of the template, and
   a member extending toward said inner edge from the lower portion of said positioning ledge.
2. The device as defined in claim 1 wherein said member is flexible and forms a clipping means with said template.
3. The device as defined in claim 1 wherein said means includes first and second discs mounted on said carrier and receiving said template therebetween.

References Cited

UNITED STATES PATENTS

| | | | |
|---|---|---|---|
| 959,639 | 5/1910 | Stanton | 33—190 |
| 2,637,909 | 5/1953 | Thacker | 33—180 |
| 2,813,347 | 11/1957 | Henick | 33—180 |
| 2,844,883 | 7/1958 | Schwarz | 33—190 |
| 2,853,791 | 9/1958 | Wood | 33—180 |
| 3,129,515 | 4/1964 | Best | 33—180 |

FOREIGN PATENTS 155,647  12/1920  Great Britain.

SAMUEL S. MATTHEWS, *Primary Examiner.*